United States Patent
Moorthi et al.

(10) Patent No.: US 10,083,027 B2
(45) Date of Patent: Sep. 25, 2018

(54) SYSTEMS AND METHODS FOR MANAGING SOFTWARE DEVELOPMENT ENVIRONMENTS

(71) Applicant: Solano Labs, Inc., San Francisco, CA (US)

(72) Inventors: Jay Moorthi, San Francisco, CA (US); William K. Josephson, Greenwich, CT (US)

(73) Assignee: Solano Labs, Inc., San Francisco, CA (US)

( * ) Notice: Subject to any disclaimer, the term of this patent is extended or adjusted under 35 U.S.C. 154(b) by 0 days.

(21) Appl. No.: 14/206,443

(22) Filed: Mar. 12, 2014

(65) Prior Publication Data

US 2014/0282400 A1    Sep. 18, 2014

Related U.S. Application Data

(60) Provisional application No. 61/783,860, filed on Mar. 14, 2013.

(51) Int. Cl.

| | |
|---|---|
| *G06F 8/71* | (2018.01) |
| *G06F 8/36* | (2018.01) |
| *G06Q 10/10* | (2012.01) |
| *G06F 9/455* | (2018.01) |

(52) U.S. Cl.
CPC ............ *G06F 8/71* (2013.01); *G06F 9/45558* (2013.01); *G06F 2009/45562* (2013.01)

(58) Field of Classification Search
CPC .................... G06F 8/70–8/77; G06F 8/751
See application file for complete search history.

(56) References Cited

U.S. PATENT DOCUMENTS

| | | | | |
|---|---|---|---|---|
| 6,907,546 | B1* | 6/2005 | Haswell | G06F 11/3684 714/38.11 |
| 8,245,192 | B1* | 8/2012 | Chen | G06F 8/30 717/103 |
| 2005/0028143 | A1* | 2/2005 | Aridor | G06F 8/71 717/122 |
| 2006/0059253 | A1* | 3/2006 | Goodman | G06Q 10/10 709/223 |
| 2007/0083423 | A1* | 4/2007 | Delbridge | G06Q 10/10 705/12 |
| 2007/0198970 | A1* | 8/2007 | Horii | G06F 11/3688 717/124 |
| 2007/0294667 | A1* | 12/2007 | Caceres | G06F 8/36 717/120 |

(Continued)

*Primary Examiner* — Li B Zhen
*Assistant Examiner* — Mohammad Kabir
(74) *Attorney, Agent, or Firm* — Fitch Even Tabin & Flannery LLP

(57) ABSTRACT

Systems and methods for branched development environments enable construction of development and deployment environments for use at various stages of software development and delivery. Various embodiments are configured to deliver these constructed environments to reproduce faithfully the state of an application at a given revision of the application's source or configuration. The branched development system can be configured to use the constructed environments to offer a variety of novel results and benefits that simplify the development, test, deployment, and debugging tasks commonly associated with software throughout its lifecycle.

22 Claims, 4 Drawing Sheets

(56) References Cited

U.S. PATENT DOCUMENTS

| | | | | |
|---|---|---|---|---|
| 2008/0059941 A1* | 3/2008 | Payne | ........................ | G06F 8/71 717/100 |
| 2008/0209400 A1* | 8/2008 | Parker et al. | .................. | 717/122 |
| 2008/0222606 A1* | 9/2008 | Solirov | ............... | G06F 11/3672 717/122 |
| 2009/0300580 A1* | 12/2009 | Heyhoe | ..................... | G06F 8/71 717/106 |
| 2009/0300641 A1* | 12/2009 | Friedman et al. | ............ | 718/104 |
| 2010/0064277 A1* | 3/2010 | Baird | ........................ | G06F 8/72 717/120 |
| 2010/0192220 A1* | 7/2010 | Heizmann et al. | .............. | 726/19 |
| 2010/0332535 A1* | 12/2010 | Weizman | ............ | G06F 11/3672 707/770 |
| 2012/0036399 A1* | 2/2012 | Howard | .................... | G06F 8/71 714/49 |
| 2012/0297361 A1* | 11/2012 | Dotan | ........................ | G06F 8/71 717/110 |
| 2012/0324281 A1* | 12/2012 | Goroff | ................ | G06F 11/2215 714/15 |
| 2013/0047036 A1* | 2/2013 | Pechanec | ............ | G06F 11/3672 714/38.1 |
| 2013/0054806 A1* | 2/2013 | Francis | ............... | H04L 67/1002 709/226 |
| 2013/0227525 A1* | 8/2013 | DeLuca et al. | ............... | 717/122 |
| 2014/0089483 A1* | 3/2014 | Anderson | ............... | G06F 21/55 709/223 |
| 2014/0143756 A1* | 5/2014 | Liang | ........................ | G06F 8/70 717/120 |
| 2014/0172344 A1* | 6/2014 | Laird | ................. | G01R 31/2894 702/117 |

\* cited by examiner

SYSTEMS AND METHODS FOR MANAGING SOFTWARE DEVELOPMENT ENVIRONMENTS

RELATED APPLICATIONS

This application claims priority under 35 U.S.C. § 119(e) to U.S. Provisional Application Ser. No. 61/783,860 entitled "CLOUD COMPUTE ENVIRONMENT FOR TEST DRIVEN DEVELOPMENT," filed on Mar. 14, 2013, which is incorporated herein by reference in its entirety.

BACKGROUND

In practice, software is delivered from developers to some outlet in one or more stages, comprising a Software Delivery Life Cycle (SDLC). At each stage, the software matures through code iteration, automated and manual testing, review, audit, and user feedback before being introduced in to production environments. Despite testing at each stage, oftentimes errors, bugs, and unexpected data interactions are only detected upon introduction into live production environments.

Many times this failure can be attributable to conventional software development approaches. For example, development of software by teams of people is organized by grouping work together. Software Configuration Management (SCM) systems provide organization for group development, by collecting the source code and configuration data for a software deliverable into a source code repository. A popular approach to tracking and development on an SCM includes the use of codeline tracking. Each codeline is a sequence of revisions of a set of source code files. For example, a revision B builds on a previous revision P by specifying a transformation to P that produces B. It is thus possible to track the evolution of work through specific transformations or a codeline.

Codelines are said to branch when multiple revisions (B0 . . . Bn) are all based on the same previous (or parent) revision P without any relationship between B0 . . . Bn. In this case, multiple codelines exist. In such cases, there is often a main (or master, or trunk) codeline, whose revisions serve as parents. Branches can merge—applying the revisions unique to B1 to P produces P' and P' can then be used as a baseline upon which to produce new code. Branches can be abandoned, by causing the SCM to forget their unique changes. Logically, the codelines are directed acyclic graphs (DAGs), where each node captures the state of the source and edges represent change events that relate one state to another. These DAG can be represented explicitly by the SCM, implicitly among the personal workspaces created by developers, tracked by a central controller, or distributed across multiple asymmetric controllers.

Branching codelines are ubiquitous in the modern SDLC. They allow development on different parts of a system to occur without interfering with each other until an agreed upon point. Risky, experimental work is isolated, independent work can go on in parallel, and when work is ready to be released, components can be assembled in an orderly way. Qualification and review apply against mutually agreed-upon reference points.

SUMMARY

It is realized that major shortcomings of existing SCM systems include their failure to do more than only organize software source code. A great deal of effort is still expended mapping codeline branches to other systems, for example, to developer workstations, test environments, review and qualification tool systems, QA team systems, staging servers, beta tester systems, etc. The inability to effectively and/or consistently map codeline branches can result in inconsistent testing, development, and execution.

Accordingly, aspects of example systems and methods for branched development environments are described that allow construction of development and deployment environments for use at various stages of software development and delivery. Various embodiments are configured to deliver these constructed environments to reproduce faithfully the state of an application at a given revision of the application's source or configuration. The branched development system can be configured to use the constructed environments to offer a variety of novel results and benefits that simplify the development, test, deployment, and debugging tasks commonly associated with software throughout its lifecycle.

According to some embodiments, associating the constructed environments with software and configuration revisions allows for underlying relationships between revisions to be used and presented along with the constructed environments. Further, consistently constructed environments can be used to provide consistent, distributable, and/or repeatable platforms on which to execute every stage of an SDLC, insuring identification of development issues, minimizing code merge issues, and preventing errors to pass undetected based on development execution on inconsistent software or platform revisions.

In some embodiments, the branched development environments can maintain and reproduce historical production environments, historical development environments, or other historical stages of SDLC environments faithfully and consistently. Providing easy access to complete and consistent historical environments enables historical based re-testing of new errors. Testing through historical environments can facilitate resolution by identification of first instance of such an error.

According to one aspect, a system for managing development environments is provided. The system comprises at least one processor operatively connected to a memory, the processor when executing is configured to define a plurality of source code revisions associated with at least one application, define a plurality of environment configurations, including data dependencies for the at least one application, generate a development environment, wherein generating the development environment includes establishing a respective source code revision and a respective set of environment configurations with a specified revision of the at least one application's source code and configuration, clone the development environment on compute resources, wherein the development environment is configured to accept modification to the at least one application's source code or configuration, and qualify modifications to the at least one application's source code or configuration based on qualifying the development environment and the modifications to the at least one application's source code or configuration.

According to one embodiment, the system further comprises an archive component configured to automatically store cloned development environments. According to one embodiment, the archive component is configured to store automatically any dependencies for the cloned development environment. According to one embodiment, the archive component is further configured to transition respective cloned development environments between active and idle states. According to one embodiment, the respective cloned development environment is associated with cloud compute resources executing the respective cloned development environment in the active state and wherein the respective cloned development environment is de-provisioned responsive to the transition to the idle state.

According to one embodiment, the system further comprises a security component configured to de-provision environments and any dependencies, and generate non-repudiable guarantees for auditing the de-provisioning action. According to one embodiment, the system further comprises a security component configured to destroy environments and any dependencies, and generate non-repudiable guarantees for auditing the destruction action.

According to one embodiment, the system further comprises a monitoring component configured to detect automatically changes in the development environment code or configuration. According to one embodiment, the monitoring component is configured to analyze executing environments periodically to detect changes in the development environment code or configuration. According to one embodiment, the system further comprises a qualification component configured to instantiate historical development environments, and execute current test executions against a plurality of historical development environments.

According to one embodiment, the system further comprises an analysis component configured to determine configuration differences between an external environment and a cloned development environment. According to one embodiment, the analysis component is configured to execute qualification scripts to determine differences in the external environment and the cloned environment. According to one embodiment, the analysis component is configured to determine differences in the external environment and the cloned environment responsive to different results returned from the qualification scripts.

According to one embodiment, the analysis component is configured to synchronize configuration of the cloned environment with the external environment. According to one embodiment, generating the development environment includes generating encoded definitions for establishing the development environment. According to one embodiment, the system further comprises an interactive component configured to expose a cloned development environment to execution requests from external systems. According to one embodiment, the interactive component is configured to expose the cloned development environment to testing requests.

According to one aspect, a computer implemented method for managing development environments is provided. The method comprises defining, by a computer system, a plurality of source code revisions associated with at least one application, defining, by the computer system, a plurality of environment configurations, including data dependencies for the at least one application, generating, by the computer system, a development environment, wherein generating the development environment includes establishing a respective source code revision and a respective set of environment configurations with a specified revision of the at least one application's source code and configuration, cloning, by the computer system, the development environment on compute resources, wherein the development environment is configured to accept modification to the at least one application's source code or configuration, and qualifying, by the computer system, modifications to the at least one application's source code or configuration based on qualifying the development environment and the modifications to the at least one application's source code or configuration.

According to one embodiment, the method further comprises storing, automatically, cloned development environments. According to one embodiment, storing, automatically, the cloned development environments includes storing, automatically, any dependencies for the cloned development environment. According to one embodiment, the method further comprises transitioning respective cloned development environments between active and idle states.

According to one embodiment, the respective cloned development environment is associated with cloud compute resources executing the respective cloned development environment in the active state and wherein the respective cloned development environment is de-provisioned responsive to the transition to the idle state. According to one embodiment, the method further comprises de-provisioning environments and any dependencies, and generating non-repudiable guarantees for auditing the de-provisioning action. According to one embodiment, the method further comprises destroying environments and any dependencies, and generating non-repudiable guarantees for auditing the destruction action.

According to one embodiment, the method further comprises detecting, automatically, changes in the development environment code or configuration. According to one embodiment, detecting, automatically, changes in the development environment code or configuration includes analyzing executing environments periodically to detect changes in the development environment code or configuration. According to one embodiment, the method further comprises instantiating historical development environments, and executing current test executions against a plurality of historical development environments.

According to one embodiment, the method further comprises determining configuration differences between an external environment and a cloned development environment. According to one embodiment, determining configuration differences includes executing qualification scripts within each environment to determine functional differences in the external environment and the cloned environment. According to one embodiment, the method further comprises determining differences in the external environment and the cloned environment responsive to different results returned from the qualification scripts.

According to one embodiment, the method further comprises synchronizing configuration of the cloned environment with the external environment. According to one embodiment, generating the development environment includes generating encoded definitions for establishing the development environment. According to one embodiment, the method further comprises exposing a cloned development environment to execution requests from external systems. According to one embodiment, exposing the cloned development environment to execution requests from external systems includes exposing the cloned development environment to testing requests.

Still other aspects, embodiments, and advantages of these exemplary aspects and embodiments, are discussed in detail below. Any embodiment disclosed herein may be combined with any other embodiment in any manner consistent with at least one of the objects, aims, and needs disclosed herein, and references to "an embodiment," "some embodiments," "an alternate embodiment," "various embodiments," "one embodiment" or the like are not necessarily mutually exclusive and are intended to indicate that a particular feature, structure, or characteristic described in connection with the embodiment may be included in at least one embodiment. The appearances of such terms herein are not necessarily all referring to the same embodiment. The accompanying drawings are included to provide illustration and a further understanding of the various aspects and embodiments, and are incorporated in and constitute a part of this specification. The drawings, together with the remainder of the specification, serve to explain principles and operations of the described and claimed aspects and embodiments.

BRIEF DESCRIPTION OF THE DRAWINGS

Various aspects of at least one embodiment are discussed below with reference to the accompanying figures, which are not intended to be drawn to scale. Where technical features in the figures, detailed description or any claim are followed by references signs, the reference signs have been included for the sole purpose of increasing the intelligibility of the figures, detailed description, and claims. Accordingly, neither the reference signs nor their absence are intended to have any limiting effect on the scope of any claim elements. In the figures, each identical or nearly identical component that is illustrated in various figures is represented by a like numeral. For purposes of clarity, not every component may be labeled in every figure. The figures are provided for the purposes of illustration and explanation and are not intended as a definition of the limits of the invention. In the figures:

DETAILED DESCRIPTION

According to various aspects, systems and methods for branched environment development build on the idea of branched codeline conventionally employed, and transforms conventional approaches into the branching of complete environments for services and systems that are used in the course of building software applications, or any other work that can be tracked using conventional branched codelines.

According to one aspect, a branched development system enables end-users to construct, configure, and start a physical or virtual machine running a working development and deployment environment (the environment) for an application with one-click. In one embodiment, the virtual machine is constructed by the system such that the environment provided is a faithful representation of the application's state as of a given revision of the application's source. For example, each and any change in code can thus be implemented in a complete environment consistent with a live production environment.

According to another aspect, the branched development system enables "clone-and-start" operations for generating a working development and deployment environment (e.g., on a physical or virtual machine), collecting code, features, build operations, databases, etc., to implement a the environment that faithfully mirrors a current revision of the application source. The virtual machine can also be configured to mirror an existing production platform, including, for example, the software, hardware, databases, connectivity, connections that are in place, etc., and any associated revisions of the same. The cloned environments are configured to support multiple modes of operation. The modes of operations can include execution by automated agents, opening of the environment or software to remote login by end-users, and/or starting an application in a mode where it can serve requests and/or, for example, execute tests automatically.

Figure 1:
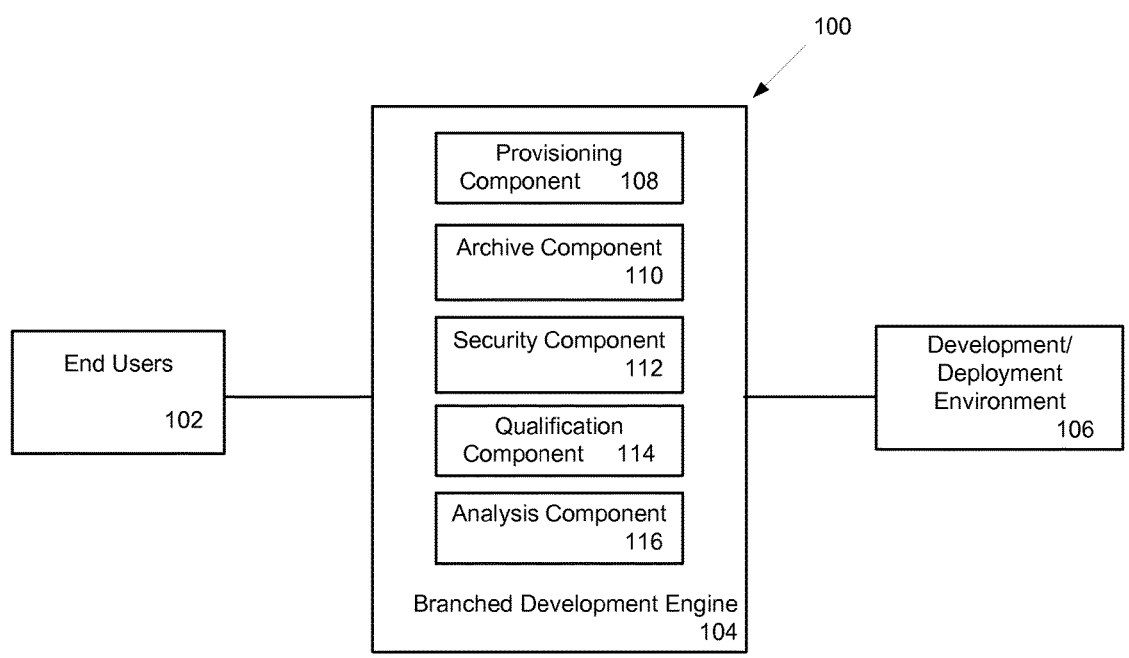
FIG. 1 is an example of a block diagram of system for generating and managing branched development environments according to one embodiment.

Shown in FIG. 1 is an example of a block diagram of system 100 for managing branched development environments. The system 100 is configured to interact with end-users 102 to define, provision, and validate branched development environments 106, for example, to be used for code revision. System 100 can also be configured to integrate automatic testing, automatic testing definition, and automatic testing execution within the branched environments 106. In further embodiments, system 100 can be configured to manage and organize integration of branched environments into new baseline environment revisions, for use in subsequent development.

According to one embodiment, the system 100 is provided that includes a branched environment engine 104 that accepts user requests to access a branched development environment. The engine 104 can be implemented and executed on a general-purpose computer system (e.g., system 400 and/or 402 of FIG. 4 discussed in greater detail below). The branched environment engine 104 can be configured to define and/or provision a current branched environment based on, for example, a current production environment, a current validation environment revision, among other options. In some embodiments, the engine 104 can accept user specification of criteria on which to define and/or provision a branched environment.

Using the capability to construct, validate, and track cloned environments, engine 104 can be configured to automatically creating new environments and provision them to appropriate cloud compute resources. For example, the engine 104 can create and provision environments based on events in the software delivery lifecycle (SDLC), including creation of new "branched" codelines, changes to source code, changes to relationships between branches (merging, becoming defunct or idle), changes to teams and responsibilities, new project phases, etc. In some embodiments, the engine 104 can include a provisioning component 108 configured to create and/or provision cloud compute environments that can be used to develop new source code and/or modify existing source code, for example, to add features, functions, etc.

The provisioning component 108 can be configured to detect environment changes executed by a user (e.g., a developer) via integration with customer communication tools during execution of the development environment. For example, the development environment can be defined to include software configured to, for example, monitor a source code repository, a software issue tracker, a project planning tool, or a personnel manager for change activity. The provisioning component 108 can be configured to detect changes automatically, in the background, and/or without user intervention. In one example, the provisioning component 108 is to check the development environment periodically.

In some embodiments, the engine 104 can include a storage component 110 configured to archive any instantiated environments (e.g., development, deployment, and their modifications, among other options). Further, the storage component 110 can be configured to transition archived environments to an idle state with no provisioned compute resources. The storage component can maintain idle state environments and all associated settings, for example, to re-provision, as needed.

According to some embodiments, the storage component 110 is configured to transition archived environments to the idle state responsive to determining that their associated source branch or team becomes inactive. In some examples, the storage component 110 can be configured to determine if a source branch or development team has become inactive based on monitoring SCM activity. In other examples, a SCM tool can provide notifications or reports to the storage component 110 on a state of a codeline, source branch, team, etc. In yet other examples, inactive code branches or teams can be identified responsive to notifications received from a project tracking tool, or after a configurable amount of time. In one embodiment, a system administrator can set a time out period for an environment based on inactivity, no access, no changes, etc., to a codeline. Once the time out period is exceeded the storage component 110 can be configured to transition the environment to an idle state.

According to one implementation, the storage component can analyze an environment to determine if any development, changes, modifications, etc. have occurred prior to idling the environment. For example, the storage component 110 can be configured to identify and capture any changes made in the environment, to the application, or by the application (including e.g., source edits, logs, generated data). Any identified changes can be stored automatically with the idle environment, so that the environment can be regenerated and/or re-provisioned in the same state prior to idling.

The engine 104 can also be configured to de-provisioning and/or destroy environments and their dependencies based on system defined policies, user specified policies, pricing strategies, etc. In some embodiments, the provisioning component 108 and/or the storage component 110 can be configured to de-provision and/or destroy environments responsive to defined policies. In some examples, system defined policies can specify a maximum number of instantiated environments. Further, pricing policies can implement maximum spending rates, thresholds, caps, etc. that are not to be exceeded. In some embodiments, the virtual machine(s) hosting the development and deployment environments, their dependencies, etc., are provisioned from cloud compute markets, where the cloud compute resources being used are associated with a cost or pricing schedule. Once a maximum cost has been exceeded, the engine 104 can identify environments to idle, destroy, and/or de-provision. In some examples, the least recently used environment can be de-provisioned. Other replacement strategies can be employed (including, e.g., least costly to re-provision, fewest accesses, currently not executing, etc.).

In some implementations, the security of the instantiated environment can be paramount. Clients developing new operating systems, new mobile computing platforms, or patching security vulnerabilities may require security guarantees to insure that their development and deployment is not compromised with any disclosure. According to one embodiment, the engine 104 can be configured to auditably and non-repudiably archive the state of destroyed environments. Further, archiving of destroyed environments can be prevented based on security settings. In some embodiment, access to idle environments, settings, and dependency information can be securely preserved. In some embodiments, the system enables specification of access control rules, which can include encryption schemes (e.g., encrypted execution environments, encrypted executions, encrypted settings information, etc.) configured to limit access to any environment to users specified/authorized by a client. Further, security measures can include auditably and non-repudiably erasing any destroyed environment. In some embodiments, the engine 104 can include a security component 112 configured to implement the described security functions.

Further, the security component 112 can be configured to accept user specification of security policies, including specific actions to be taken with respect to development environments, policies regarding execution within the environment, security policies an/or actions regarding data dependencies, and/or any generated results. Some known approaches for auditable non-repudiable archival and deletion of files or data object can be implemented by the security component 112. For example, U.S. Pat. No. 7,363, 326 describes some examples of auditable and non-repudiable archival and deletion of files or data objects, incorporated by reference herein in its entirety.

According to other embodiments, security policies can be specified regarding identification and management of generated environments. In one embodiment, environments can be securely identified by a strong hash of a source code revision identifier, the content of the source code, and the content configuration used by the source code or the system in constructing the environment. In some examples, the strong hash can be used to insure the integrity of the environment and provide additional security measures.

According to another aspect, cloned environments can be used by the system 100 to execute qualification steps for the application being developed, the source code changes being implemented, etc. Qualification can occur responsive to system defined events (e.g., new code branch, new commit of code changes, merge operations between code branches, user indication of ready for merge, etc.). In some embodiments, the engine 104 can include a qualification component 114 configured to manage and/or execute one or more automated and manual qualification processes. In some embodiments, the system and/or engine 104 can provide a flexible definition format for specifying qualification tests, results, etc. that must be met by application(s) running in the environments in order for the application(s) to be qualified. In further embodiments, the engine 104 and/or qualification component 114 can be configured to executed specific processes for qualification based on user definition of qualification criteria (e.g., process 200, FIG. 2, discussed in greater detail below). The qualification component 114 can also be configured to accept and execute rules for defining actions to take on code branches, code merges, entire environments, etc. based on the results of the qualification testing.

For example, the qualification component 114 can be configured to review automatically source code developed in the environment. The source code review can include compliance testing for code requirements specified on the system (e.g., by the user or an administrator). Code development requirements can include, for example, variable naming conventions, variable consistency, appropriate method calls, proper memory allocation/release, consistency in class/object definition, among other examples. In some examples, code requirements can include specification of structure within the code, and the qualification component can be configured to derive structural representations of the code being reviewed for comparison to specified structures. Other automated review approaches can be implemented by the qualification component 114.

The qualification component 114 can also be configured to execute any one or more of code review, performance testing, security testing, visualization review (e.g., screen for layout errors), copy edit review, and internationalization issues/errors, among other options. According to some embodiments, the qualification component 114 is configured to collect the results of the defined tests and select post-qualification actions to be taken responsive to the results received. In some embodiments, this can include rejecting a code commit operation, rejecting a merge operation, etc. In some examples, when the post-qualification action includes rejecting an operation, the system can provide detailed information on why the qualification tests failed, identification of specific issues (e.g., performance test failure, exceeded bounds of requirements, etc.), as examples.

As discussed, based on the results of the qualification testing, the system 100, engine 104, and/or qualification component 114 can execute post qualification procedures. The post qualification procedures can include committing code branches into base line production code. Further, qualified code may be staged for live production deployment responsive to passing qualification tests. In some examples, codelines, code branches, and/or code environments can be merged, and used for creation of any subsequent development/deployment environments as a result of post-qualification procedures. In other examples, existing environments can be updated to reflect new code baselines or code revisions that have passed qualification testing.

According to one embodiment, system 100 provides users and/or administrator the ability to define a variety of rules that can include changing version numbers of a current code baseline, staging qualified application for deployment, delivering a virtual machine including the developed application and any dependencies for additional acceptance testing, etc. Some qualification approaches can include a variety of qualification levels, where each level of qualification includes a post-qualification procedure and triggering of a next qualification event.

In some embodiments, system 100 and/or engine 104 can be configured to re-start or recreate environments from current and past revisions in a source branch. The engine 104 can include, for example, an analysis component 116 configured to perform backwards looking analysis. In one embodiment, the analysis component 116 can be configured to regenerate archived environments to perform any one or more of security testing, bug identification, compatibility testing, usability analysis, performance comparisons, visualization testing (e.g., deltas between screen captures and/or videos of the application being tested), among other options. In some settings, results from qualification testing can be accessed by the analysis component 116 and used to focus backward looking analysis. For example, the analysis component 116 can identify failed tests and analyze prior versions of the application, code, environment, dependencies, etc., to determine if an error was also presented prior to a current qualification event. The analysis component 116 can also determine when an error was actually introduced into the source code based on such backward looking analysis.

According to some embodiments, the analysis component 116 can also be configured to identifying differences between an independently started environment and environments started by system 100. For example, the analysis component can be configured to execute a standardized qualification script to determine environmental differences as well as versioning differences, among other options. In one implementation, the script is executed against both a synthetic environment (e.g., started by system 100) and a running production environment to determine whether the code, application(s), and/or software is being developed and tested with the same parameters (including, e.g., environmental parameters, matching database versions, database contents, screen sizes, disk capacity, library versions, etc.) as where the software is actually deployed.

In some embodiments, the scripts can be configured to determine that the clone system is similar to the external environment in terms of amounts of RAM, disk space, installed system packages, what processes or system services are running, how many users are logged in, what sort of encryption is being used, etc.

In further embodiments, the engine 104 and/or the analysis component 116 can be configured to synchronizing an independently started environment (e.g., production environment) with a system-started environment in order to capture the state of an external environment that may have diverged. In one example, the engine 104 can implement systems integration frameworks to provide information on how various components in a system architecture interact and how those interaction may differ from system-started environments. Once differences in system level interactions are identified, the engine 104 can be configured to modify virtual architectures to synchronize the environments and/or system architectures. In some examples, the engine 104 can operate via the analysis component 116. For example, the analysis component 116 can extract configuration settings from a running environment automatically, and build a virtual environment to copy those settings.

According to some embodiments, the constructed environments can be stored on the system as the settings and dependencies necessary to create and provision the environment for development and/or deployment. In some implementations, the system 100 and/or engine 104 can be configured to manage the creation of environments from encoded or encrypted definitions rather than storing state information for an environment directly. For example, the security component 112 can be configured to encode and/or encrypt environment definitions, which can be archived (e.g., by the archive component 110) and used to create the environment upon requests. In one example, by storing encoded definitions the system 100 is configured to prevent an attacker from learning any information about a created environment, even if the attacker is able to access environment definition information.

The system 100 can also be configured to provision and/or execute an environment in an interactive or request-serving mode to facilitate both automated and manual verification. For example, verification can include sensory examination (display, layout, response, tone), copy editing, digital rights management (DRM) validation, security audit, configuration management, A/B testing, among other options. The system 100 can record the results of such verification in a consistent manner, and associate the results with the specific revision of the executing environment, as well as the revisions of software, dependencies, etc. on which the environment is based.

Further, the system can be configured to use archived environments or current environment definitions to construct distributable images to serve as backups for users. For example, system 100 and/or engine 104 can be configured to construct a bootable virtual machine image from the state information stored with an environment. According to some embodiments, the system and/or engine 104 can use environment specifications to construct deployable servers. The deployable servers can be defined for execution on a cloud compute environment, and once provisioned can be used to test the deployable servers. In other embodiments, the system 100 and/or engine 104 can construct virtual images or configurations that can be pushed into a deploy target (e.g., a cloud compute provider). In one example, the engine 104 can generate a configuration for a platform as a service (PaaS) system (e.g., the known Heroku), or a template of hosts and services for a cloud provider like Amazon Web Service (AWS), or a configuration to be implemented by a system architecture tool like Chef or Puppet.

Figure 2:
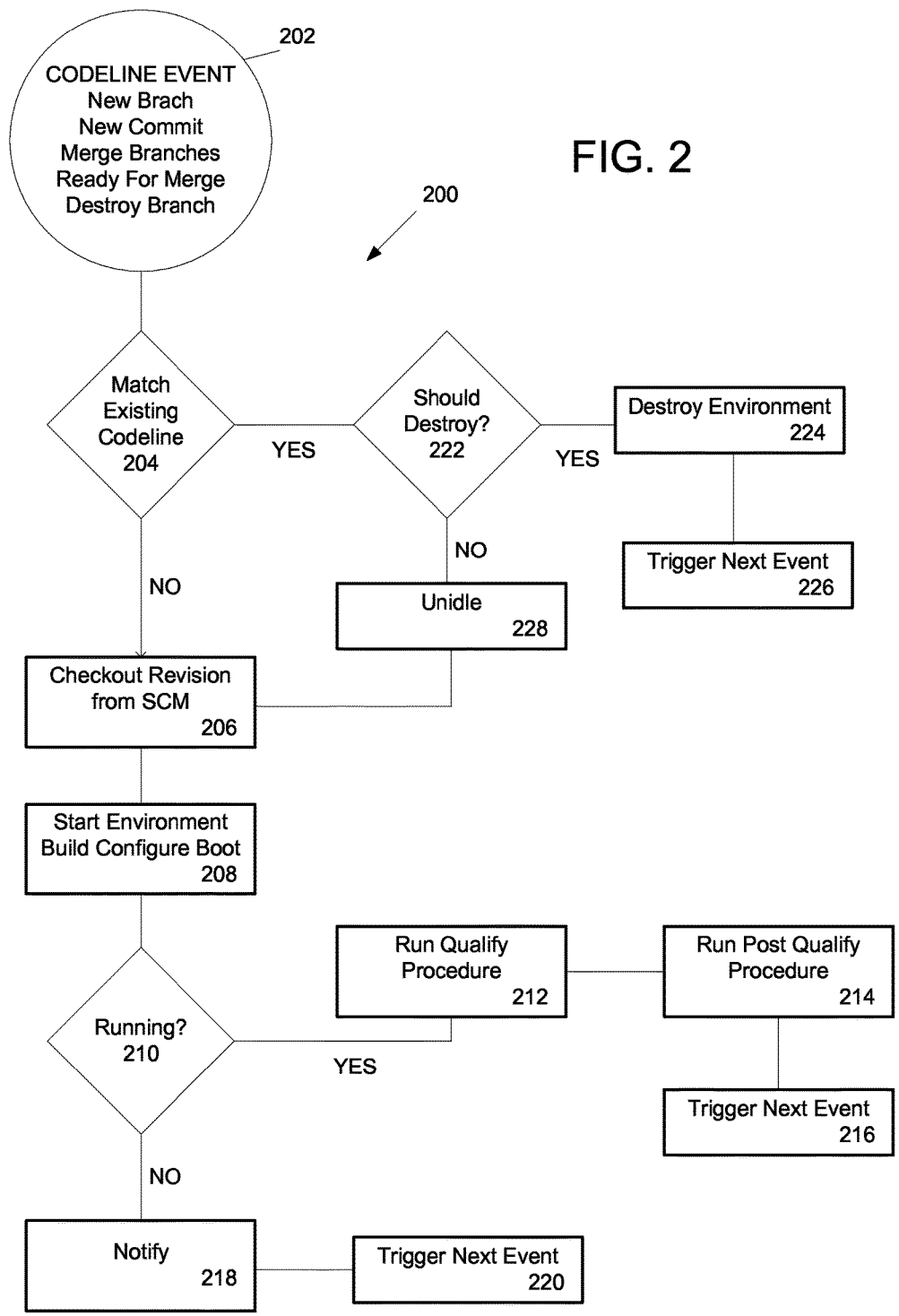
FIG. 2 is an example process flow for executing development events within development environments, according to one embodiment.

In some embodiments, a branched development system (e.g., 100) and/or engine 104 can be configured to execute a number of processes to provide branched development environment services to end-users or client computer systems. Shown in FIG. 2 is an example process flow 200 for triggering qualification procedures that can be executed by a branched development system and/or engine 104. The process 200 beings at 202 with the initiation of a codeline event for generating a development environment at 202. The codeline event can include any number of codeline events associated with conventional development of source code. In some examples, codeline events for generating the development environment includes instantiation of a new codeline branch triggering subsequent generation of the development environment to host the new codeline branch. Other example codeline events include, new code commits. As discussed, "commit" is an SCM procedure for versioning baseline source code, for example, to accept modifications into a new and current version of the source code for an application. In some implementations, the new committed baseline version can be deployed as a live production version following, for example, subsequent procedures to qualify a new committed code baseline. Further example codeline events include merge operations, evaluation of existing code to merge with other branches, destroy a current code branch, among other options.

Codeline events at 202 can be triggered automatically by the system, by an end-user, and/or by client computer systems. Responsive to codeline events at 202, the codeline associated with the codeline event is evaluated to determine if it matches an existing codeline at 204. If the codeline does not match an existing codeline 204 (NO), a codeline revision is checked out for the codeline associated with the codeline event from 202 at 206. Once the codeline revision is checked out through an SCM control process at 206, an environment build for the codeline is initiated at 208. Initiation of environment build can include provisioning of cloud compute resources to host a development and/or deployment environment for the codeline. Further, configuration options for the created environment can be retrieved as part of 208. Various environment specifications can be defined as part of the creation of the environment (e.g., processing power or compute resources allocated, communication configurations, hardware elements defined and/or virtualized, virtualization settings, connections to other systems, data inputs, environment dependencies, etc.). If the environment created is running 210 YES, then qualification testing can be executed on the environment and the codeline at 212. Qualification testing at 212 can be configured to determine acceptability of any changes in a development environment according to system criteria, user criteria, automatic testing, evaluation of automatic test results, manual test suites, among other options. In some embodiments, qualification at 212 can include performance testing, for example, to determine that a codeline version maintains a data processing throughput.

Once qualification testing at 212 is complete, post qualification procedures can be executed at 214. Post qualification procedures can include versioning of codeline branches to define a new source baseline from which other code development can occur. Post qualification procedures at 214 can include the merging of qualified codelines. In other implementations, post qualification procedures at 214 can also include code deployment operations. In some examples, code deployment can include staging of qualified code to one or more deployment environments. According to one embodiment, staging of the qualified code to a deployment environment can be a next triggering event (e.g., at 216) which can cause execution of additional qualification events and further post qualification processing. For example, a next triggering event at 216 can result in re-execution of process 200 at 202.

If the created environment fails to run or if the creation of the environment fails 210 NO, process 200 continues at 218 with notification messages regarding the failure. The notification messages at 218 can be communicated directly to end-users, client systems, and/or the branched development system (e.g., 100). At 220, process 200 can repeat with a next codeline event. In some embodiments, the next codeline event triggers re-starting of the process 200 under any conditions defined for the next event. The codeline event can be, for example, user-entered, triggered automatically by a branched development system, and/or triggered by a client system.

According to some embodiments, a codeline event from 202 is determined to match an existing codeline at 204 YES. The process 200 continues with a determination of whether to destroy the matching codeline at 222. If the codeline event at 202 was a destroy codeline operation, the process 200 proceeds from 222 YES to 224, where the environment and associated codeline is destroyed. In some embodiments, audit trails are generated for proving the destruction of the environment. Security conscious clients may require assurance or even guarantees that their code has been non-repudiably destroyed. Once the environment is destroyed at 224, process 200 can continue with further codeline events. For example, triggering a next event at 226 can cause re-execution of process 200.

In other embodiments, if the codeline matches an existing environment 204 YES and the environment should not be destroyed 222 NO, then an existing environment can be retrieved from storage or made active from an idle state at 228. Once the existing environment is made active, the process 200 can continue at 206 as discussed above. According to other embodiments, the process 200 can be executed in other orders, can combine operations into fewer number of steps, and can exclude some operations described above. In other embodiments, process 200 can include or be executed in conjunction with other processes.

Figure 3:
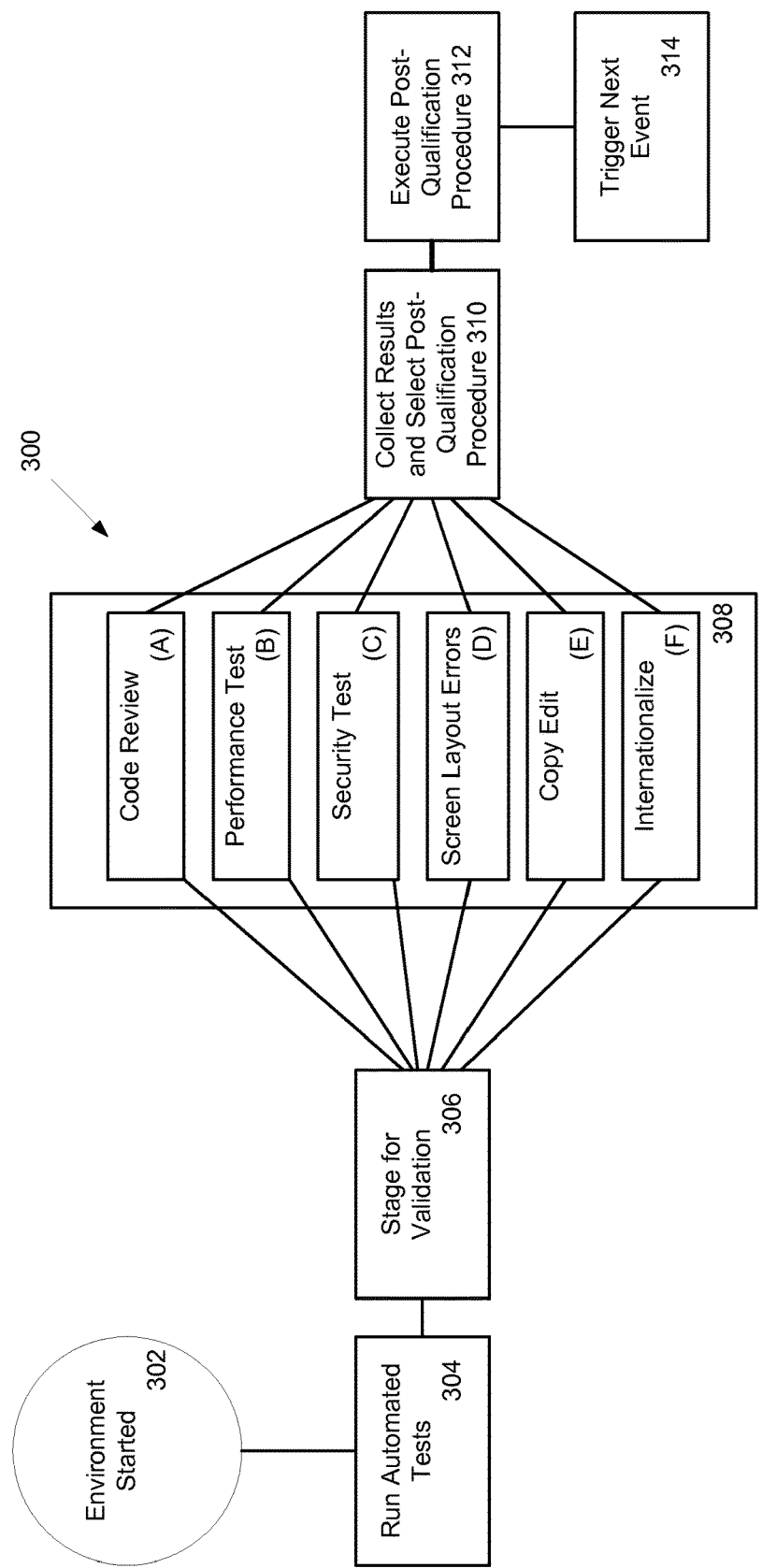
FIG. 3 is an example process flow for testing qualifications and acting on the results, according to one embodiment.

For example, FIG. 3 illustrates an example process flow 300 for determining qualification. Process 300 can be executed alone, in conjunction with another process (e.g., 200) and/or as part of another process (e.g., 200 at 212). According to one embodiment, process 300 begins at 302 with starting an environment associated with a codeline and/or application feature. Automated testing is executed against and/or within the environment at 304. The automated testing can be configured to insure minimum functionality and/or present functionality. In some embodiments, the automated testing at 304 is configured to insure that obvious issues, errors, bugs, etc., are detected prior to staging the environment for validation at 306. Staging for validation can include identification of what operations are to be performed during validation. In some embodiments, configurations for validation can be specified as part of the starting of process 300 and the configurations can be retrieved at 306. For example, a user may specify or instantiate process 300 in the context of code review for a current codeline branch. At 308 validation testing is executed according to the specified configurations and/or the context in which process 300 is instantiated. As discussed code review 308A can be executed as part of 308 validation testing. The source code review can include compliance testing for code requirements specified (e.g., by the user, administrator, defined on the system and/or a client system, etc.). Code development requirements can include, for example, variable naming conventions, variable consistency, appropriate method calls, proper memory allocation/release, consistency in class/object definition, among other examples. In some examples, code requirements can include specification of structure within the code, and the validation testing at 308 can include deriving structural representations of the code being reviewed for comparison to specified structures. In other examples, other automated review approaches can be implemented during code review 308A.

Other validation testing at 308 can include performance testing 308B, security testing 308C, screen for layout errors 308D, copy/edit review 308E, and internationalization review at 308F. The configurations specified at launch of process 300 can dictate what validation testing is performed out of a validation testing suite of operations (e.g., 308A-308F). Further the context in which process 300 is called can dictate what validation testing is performed out of the validation testing suite of operations. In some embodiments, individual operations can be specified from within the suite (e.g., 308A-308F). In other embodiments, subsets of the operations can be specified. In yet others, the specification of one operation can include the execution of subsequent levels of test operations (e.g., specification of 308A is followed by 308B, C, D, E, and F). In other implementations, validation testing can be configured to employ any subset, combination, and/or order of the validation operations. Further, any of the specified validation operations 308A-F can be executed in parallel in some embodiments.

According to one embodiment, performance testing at 308B can be executed in conjunction with and/or subsequent to code review at 308A. Performance testing can include testing on processing rates, processing capacity, among other options. In some embodiments, benchmark processing targets can be defined against live production environments, and performance testing can simulate conditions to test those benchmarks. In other embodiments, data dependencies can be implemented and evaluated during performance testing.

According to another embodiment, security testing at 308C can be executed in conjunction with code review and/or performance testing or can be executed subsequent to testing at 308A or 308B. Security testing can include automated testing within and/or on an environment to identify vulnerabilities. Further embodiments can execute security testing at 308C for specific features to insure that any defined security features exist and/or function appropriately after source code modification.

According to other embodiments, validation testing at 308 can also include user interface/visualization testing. For example, at 308D codelines, environments, and/or application features can be evaluated for layout issues. The formatting, organization, and visualization of elements and/or features of an application can be evaluated to determine if those features meet defined requirements, for example, at 308D. The process 300 can also include validation for content textual errors, spelling mistakes, semantic errors arising due to language translation or transliteration by a third party, at 308E. For example, these issues and others generally termed "copy edit issues" can be identified as part of generating user interfaces, or in reviewing displays that will be generated by the application. Any renderable text (e.g., included in display screens, error messages, confirmation, wait displays, etc.) can be reviewed at 308E. Validation testing at 308 can also include code review for internationalization issues at 308F. In some implementations, various applications are deployed globally and compliance with international requirements can be necessary to display an application, user interfaces, etc., appropriately. The validation suite of operations can include functions for determining international compliance, identification of internationalization issues, etc.

Results from the validation testing at 308 (including e.g., 308A-F) are collected at 310. Based on the collection of results, post-qualification procedures can be executed at 312. For example failures of some tests can prompt re-execution of validation testing at 308. If issues are detected from the collection of results (e.g., at 310) the post-qualification procedure can include rejecting an event and/or request that initiated process 300. For example, if a codeline commit procedure was requested as part of and/or to start process 300, the commit operation can be rejected. In further examples, the rejection can specify what issues arose during testing to cause the rejection. In some implementations, suggested fixes may be provided as part of the notifications.

Various post-qualification events can also be defined based on the collected results at 310. For example, passage of validation testing can trigger execution of a code merge operation at 312 or execution of a code commit operation. According to various embodiments, the collection results can be analyzed at 312 to determine what post-qualification procedure is appropriate. For example, system defined conditions can be defined on various result outcomes, and each rule can be associated with a post-qualification action to be executed. Upon matching results to the conditions at 310, process 300 continues with the execution of the associated action at 312. Once an identified action has been executed, process 300 can continue at 314 with the triggering of a next event associated with a codeline and/or environment. For example, the next event can include additional codeline events (e.g., commit, merge, destroy, etc.). Triggering at 314 can include re-execution of process 300 for the next event. In one embodiment, qualification is an iterative process, where process 300 is executed for a first level of qualification testing associated with a set of qualification results. In one example, upon passing the first level of qualification testing, the codeline and/or environment is passed along to a second level of qualification associated with different qualification requirements. Qualification for the second level can include additional executions of process 300. In another example, qualification can be followed by deployment of qualified codeline and/or environments to live production systems. Other options can also be defined, for example, as part of selection and execution of post-qualification procedures at 310-312.

Branched Development and Interactive Testing Integration

Another aspect of the system incorporates the ability to provide the user an interactive testing and debug environment through instantiation of virtual development and/or deployment environments. In one embodiment, this can be considered "Testing on Demand." According to some embodiments, testing on demand can be used as part of a process to qualify developed code, qualify software features, validate functionality and/or performance goal, prior to accepting modifications. Testing on demand can be used as a pre-requisite to checking in new code, new code branches, codelines, new feature sets, deploying new code, etc. Some examples of testing on demand and systems for systems for improving software quality are described in co-pending U.S. application Ser. No. 13/682,811 filed on Nov. 12, 2012 incorporated by reference in its entirety herein, which can be combined with various embodiments and functions discussed herein.

One embodiment provides a managed and hosted environment for running software testing jobs in parallel. The system can be responsible for determining what services, such as databases and test frameworks to start, populating any test data sources, and running the tests in parallel. The system can be also responsible for monitoring and logging events and output in the system and returning the results to the end user for inspection. If the build and test execution is successful, the on-demand approach is fast and efficient. When tests fail, however, it can be difficult to determine what has gone wrong if a critical piece of logging is missing or failing. Furthermore, it is often the case that a user is actively developing a new piece of functionality and would like to run the same tests repeatedly until they pass while simultaneously updating the application and/or implementation under test.

According to one embodiment, a generated environment is configured to provide a consistent baseline platform from which an interactive debug mode can be implemented. Each change in code can be qualified on demand by entering into an interactive debug mode. In some implementations, iterative changes can be made and qualified, and qualified changes can be used to redefine the development platform for the next set of interactive changes. Interactive debug mode facilitates this iterative work-flow by avoiding the cost of repeated environment setup and tear-down. Further, each change, set of changes, codeline modifications, and/or codeline branch can be fully tested on demand, reducing the likelihood and/or severity of errors in smaller incremental changes.

According to one embodiment, a debug mode of execution is provided by the system through a branched development system (e.g., 100). In some embodiments, the branched development system can integrate any one or more of the functions, operations, and/or features discussed with respect to an SDLC system and/or SDLC engine in co-pending patent application Ser. No. 13/682,811, entitled "SYSTEM FOR DISTRIBUTED SOFTWARE QUALITY IMPROVEMENT," incorporated by reference herein in its entirety.

According to some embodiments, in debug mode, the system allocates a debug mode environment on demand: either at the explicit behest of the user, when the system has determined that an error in the hosted test environment warrants it, or in response to development events (e.g., check in new code, merge code/environment, deploy code, etc.). For instance, if the system determines: that a test is failing frequently, that a catastrophic error has occurred, that it was unable to capture the output or other state of test, or for another suitable reason, the system is configured to automatically start a debug mode session for a user. In another example, if a qualification event is failed, the system can be configured to trigger a debug session to highlight the cause of the failure, and/or allow a developer to resolve the issue.

In one embodiment, the system may terminate a debug mode session at the explicit request of the user, when the session has been idle for an extended period of time, when other higher priority or more lucrative jobs enter the system, when the session requires too many resources to continue, or for any other reason. When a debug mode session is terminated, the session may store the complete state of the session including any hardware or software systems, any associated state for either, any user-supplied data or test inputs, source code, executables, or test and data collection scripts, or only some subset of the state information available for the debug environment and state of execution. In one embodiment, a user may be charged a fixed fee, for actual resources consumed, for the stored state, for analytics, and/or for more detailed event collection, reporting, and analysis.

In one embodiment, the system uses pinned instances to provide for debug mode and/or other modes of operation. In a debug mode, the system can be configured to allocate hardware resources from the same pool as a hosted test environment. In another embodiment, the system can be configured to allow a user to run the debug mode on a local workstation, on local computing hardware, in a cloud or other hosting environment the user operates or leases from a third party, or on virtual machines provided by the service but running on local hardware, in a cloud the user operates, or on hardware the user leases from a third party.

According to another embodiment, debug mode hardware may be allocated by a number of means, including, but not limited to, on demand for a specified period, in advance for a specified period, or either on-demand or in advance based upon user activity. The system may start a debug mode session at the explicit request of the user or upon detecting a test failure or other anomalous behavior. If debug mode is entered upon a test failure or anomalous behavior, the system may choose to stop tests and enter debug mode immediately, enable debug mode and allow tests to continue, or enter debug mode when the entire test suite has completed.

According to some embodiments, the system includes a debug component configured to generate a debug mode environment. In some examples, the system and/or debug component can be responsible for either automatically or at the user's discretion constructing an environment suitable for running the user's tests, the test environment can be specifically tailored according to codeline information, production characteristics, and can be used to interact with development and/or deployment environments generated by a branched development engine (e.g., 104). In one example, the system and/or debug component is configured to: set up the test environment as described for a hosted test environment; retrieve the user's source code; retrieve any machine executables; retrieve any data or test inputs required to run the software; retrieve any tests, including source, executables, or test inputs; determine what tests, source, executables, data and test inputs have changed; and determine on the basis of recent changes in the environment which tests might produce different results from those previously recorded and offering to re-run those tests.

The system may also provide a mechanism such as a source code control system (e.g., SCM and/or git) or a branched development system to allow a user to retrieve updates to his program, executables, data inputs, and tests. In debug mode the system may report the state of the system and result of test in real time or wait for completion of one or more tests before producing a report.

The system may provide a programmatic interface (API), command line interface (shell), or graphical interface (GUI, e.g. a web page) for querying the state of the environment. This state includes but is not limited to the output of any programs in the environment, the log files of any software in the environment, the machine and operating system state, and the configuration of hardware and software in the environment. The system may also allow a user to start or stop individual software subsystems, query their configuration state, attach a debugger to examine their program state, and retrieve performance data including but not limited to the number of transactions, database queries, page faults, context switches, I/O transactions, and network events. The system may collate and store historical records of program state and other monitoring data. Further, it may apply a variety of statistical and machine learning techniques to this data to find anomalous behavior in either future debug mode or normal hosted test sessions. For example, the system can be configured to analyze these data and algorithms to identify frequently failing tests, intermittently failing tests, or changes to tests, source code, binaries, or input data that cause changes in system performance or correctness.

The system may use these data and its determination of frequently, intermittently, or recently failing tests or performance changes to suggest that a user in debug mode re-run these "high risk" tests. In one embodiment, the system is configured to enable a user to start network services that respond to inputs from other machines maintained and operated either by the system, the user, or a third party. Such services include, but are not limited to, remote display managers to examine graphical state, web servers, database servers, and clients for accessing the same either manually or programmatically.

General Purpose Computer System

As discussed above with regard to FIG. 1, various aspects and functions described herein may be implemented as specialized hardware or software components executing in one or more computer systems. There are many examples of computer systems that are currently in use. These examples include, among others, network appliances, personal computers, workstations, mainframes, networked clients, servers, media servers, application servers, cloud compute platforms, database servers and web servers. Other examples of computer systems may include mobile computing devices, such as cellular phones and personal digital assistants, and network equipment, such as load balancers, routers and switches. Further, aspects may be located on a single computer system or may be distributed among a plurality of computer systems connected to one or more communications networks.

For example, various aspects and functions may be distributed among one or more computer systems configured to provide a service to one or more client computers, or to perform an overall task as part of a distributed system. Additionally, aspects may be performed on a client-server or multi-tier system that includes components distributed among one or more server systems that perform various functions. Consequently, examples are not limited to executing on any particular system or group of systems. Further, aspects and functions may be implemented in software, hardware or firmware, or any combination thereof. Thus, aspects and functions may be implemented within methods, acts, systems, system elements and components using a variety of hardware and software configurations, and examples are not limited to any particular distributed architecture, network, or communication protocol.

Figure 4:
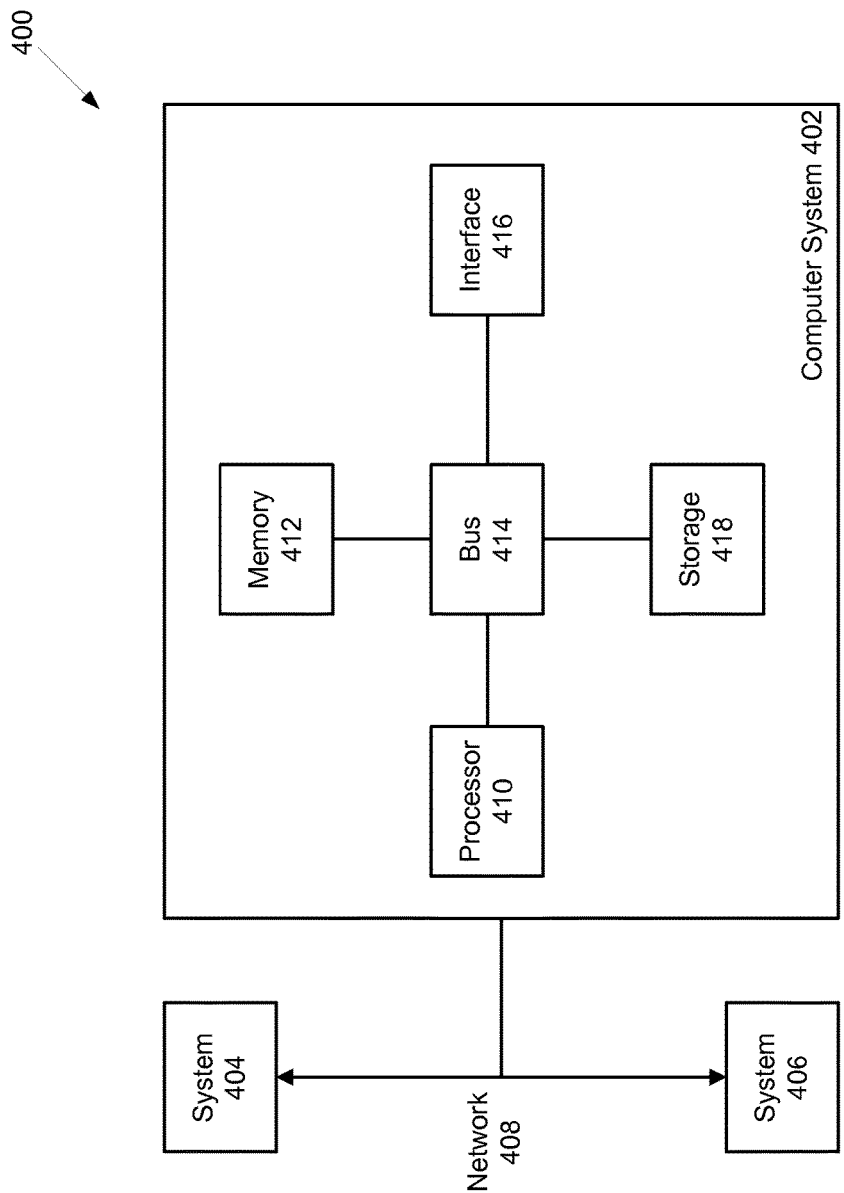
FIG. 4 is a schematic diagram of an exemplary computer system that may be configured to perform processes and functions disclosed herein.

Referring to FIG. 4, there is illustrated a block diagram of a distributed computer system 400, in which various aspects and functions are practiced. As shown, the distributed computer system 400 includes one more computer systems that exchange information. More specifically, the distributed computer system 400 includes computer systems 402, 404 and 406. As shown, the computer systems 402, 404 and 406 are interconnected by, and may exchange data through, a communication network 408. For example, a branched development system and/or can be implemented on 402, which can communicate with, for example, SCM system on 404, and/or other systems implemented on 406, which can operate together to provide the branched development functions as discussed herein. In other embodiments, branched development systems can be implemented on 402 or be distributed between 402-406.

In some embodiments, the network 408 may include any communication network through which computer systems may exchange data. To exchange data using the network 408, the computer systems 402, 404 and 406 and the network 408 may use various methods, protocols and standards, including, among others, Fibre Channel, Token Ring, Ethernet, Wireless Ethernet, Bluetooth, IP, IPV6, TCP/IP, UDP, DTN, HTTP, FTP, SNMP, SMS, MMS, SS7, JSON, SOAP, CORBA, REST and Web Services. To ensure data transfer is secure, the computer systems 402, 404 and 406 may transmit data via the network 408 using a variety of security measures including, for example, TLS, SSL or VPN. While the distributed computer system 400 illustrates three networked computer systems, the distributed computer system 400 is not so limited and may include any number of computer systems and computing devices, networked using any medium and communication protocol.

As illustrated in FIG. 4, the computer system 402 includes a processor 410, a memory 412, a bus 414, an interface 416 and data storage 418. To implement at least some of the aspects, functions and processes disclosed herein, the processor 410 performs a series of instructions that result in manipulated data. The processor 410 may be any type of processor, multiprocessor or controller. Some exemplary processors include commercially available processors such as an Intel Xeon, Itanium, Core, Celeron, or Pentium processor, an AMD Opteron processor, a Sun UltraSPARC or IBM Power5+ processor and an IBM mainframe chip. The processor 410 is connected to other system components, including one or more memory devices 412, by the bus 414.

The memory 412 stores programs and data during operation of the computer system 402. Thus, the memory 412 may be a relatively high performance, volatile, random access memory such as a dynamic random access memory (DRAM) or static memory (SRAM). However, the memory 412 may include any device for storing data, such as a disk drive or other non-volatile storage device. Various examples may organize the memory 412 into particularized and, in some cases, unique structures to perform the functions disclosed herein. These data structures may be sized and organized to store values for particular data and types of data.

Components of the computer system 402 are coupled by an interconnection element such as the bus 414. The bus 414 may include one or more physical busses, for example, busses between components that are integrated within the same machine, but may include any communication coupling between system elements including specialized or standard computing bus technologies such as IDE, SCSI, PCI and InfiniBand. The bus 414 enables communications, such as data and instructions, to be exchanged between system components of the computer system 402.

The computer system 402 also includes one or more interface devices 416 such as input devices, output devices and combination input/output devices. Interface devices may receive input or provide output. More particularly, output devices may render information for external presentation. Input devices may accept information from external sources. Examples of interface devices include keyboards, mouse devices, trackballs, microphones, touch screens, printing devices, display screens, speakers, network interface cards, etc. Interface devices allow the computer system 402 to exchange information and to communicate with external entities, such as users and other systems.

The data storage 418 includes a computer readable and writeable nonvolatile, or non-transitory, data storage medium in which instructions are stored that define a program or other object that is executed by the processor 410. The data storage 418 also may include information that is recorded, on or in, the medium, and that is processed by the processor 410 during execution of the program. More specifically, the information may be stored in one or more data structures specifically configured to conserve storage space or increase data exchange performance.

The instructions stored in the date storage may be persistently stored as encoded signals, and the instructions may cause the processor 410 to perform any of the functions described herein. The medium may be, for example, optical disk, magnetic disk or flash memory, among other options. In operation, the processor 410 or some other controller causes data to be read from the nonvolatile recording medium into another memory, such as the memory 412, that allows for faster access to the information by the processor 410 than does the storage medium included in the data storage 418. The memory may be located in the data storage 418 or in the memory 412, however, the processor 410 manipulates the data within the memory, and then copies the data to the storage medium associated with the data storage 418 after processing is completed. A variety of components may manage data movement between the storage medium and other memory elements and examples are not limited to particular data management components. Further, examples are not limited to a particular memory system or data storage system.

Although the computer system 402 is shown by way of example as one type of computer system upon which various aspects and functions may be practiced, aspects and functions are not limited to being implemented on the computer system 402 as shown in FIG. 4. Various aspects and functions may be practiced on one or more computers having different architectures or components than that shown in FIG. 4. For instance, the computer system 402 may include specially programmed, special-purpose hardware, such as an application-specific integrated circuit (ASIC) tailored to perform a particular operation disclosed herein. While another example may perform the same function using a grid of several general-purpose computing devices running MAC OS System X with Motorola PowerPC processors and several specialized computing devices running proprietary hardware and operating systems.

The computer system 402 may be a computer system including an operating system that manages at least a portion of the hardware elements included in the computer system 402. In some examples, a processor or controller, such as the processor 410, executes an operating system. Examples of a particular operating system that may be executed include a Windows-based operating system, such as, Windows NT, Windows 2000 (Windows ME), Windows XP, Windows Vista, Windows 7 or 8 operating systems, available from the Microsoft Corporation, a MAC OS System X operating system available from Apple Computer, one of many Linux-based operating system distributions, for example, the Enterprise Linux operating system available from Red Hat Inc., a Solaris operating system available from Sun Microsystems, or a UNIX operating systems available from various sources. Many other operating systems may be used, and examples are not limited to any particular operating system.

The processor 410 and operating system together define a computer platform for which application programs in high-level programming languages are written. These component applications may be executable, intermediate, bytecode or interpreted code which communicates over a communication network, for example, the Internet, using a communication protocol, for example, TCP/IP. Similarly, aspects may be implemented using an object-oriented programming language, such as .Net, SmallTalk, Java, C++, Ada, C# (C-Sharp), Objective C, or Javascript. Other object-oriented programming languages may also be used. Alternatively, functional, scripting, or logical programming languages may be used.

Additionally, various aspects and functions may be implemented in a non-programmed environment, for example, documents created in HTML, XML or other format that, when viewed in a window of a browser program, can render aspects of a graphical-user interface or perform other functions. Further, various examples may be implemented as programmed or non-programmed elements, or any combination thereof. For example, a web page may be implemented using HTML while a data object called from within the web page may be written in C++. Thus, the examples are not limited to a specific programming language and any suitable programming language could be used. Accordingly, the functional components disclosed herein may include a wide variety of elements, e.g., specialized hardware, executable code, data structures or data objects, that are configured to perform the functions described herein.

In some examples, the components disclosed herein may read parameters that affect the functions performed by the components. These parameters may be physically stored in any form of suitable memory including volatile memory (such as RAM) or nonvolatile memory (such as a magnetic hard drive). In addition, the parameters may be logically stored in a propriety data structure (such as a database or file defined by a user mode application) or in a commonly shared data structure (such as an application registry that is defined by an operating system). In addition, some examples provide for both system and user interfaces that allow external entities to modify the parameters and thereby configure the behavior of the components.

Having thus described several aspects of at least one example, it is to be appreciated that various alterations, modifications, and improvements will readily occur to those skilled in the art. For instance, examples disclosed herein may also be used in other contexts. Such alterations, modifications, and improvements are intended to be part of this disclosure, and are intended to be within the scope of the examples discussed herein. Accordingly, the foregoing description and drawings are by way of example only.

What is claimed is:

1. A system for managing development environments, the system comprising:
   at least one processor operatively connected to a memory, the at least one processor when executing is configured to:
   define a plurality of source code revisions associated with at least one application;
   define a plurality of environment configurations, including data dependencies for the at least one application;
   generate a respective executable branched development environment associated with a respective set of source code revisions and a respective set of environment configurations, wherein generating the respective executable branched development environment includes establishing the respective source code revisions and the respective set of environment configurations with a specified revision of the at least one application's source code and configuration;
   manage a plurality of respective codeline branches with instantiations of a plurality of respective executable branched development environments;
   clone a respective executable branched development environment on compute resources to mirror at least a portion of an existing production platform that supports the executable branched development environment, wherein the executable branched development environment is configured to accept modification to the at least one application's source code and configuration; and
   automatically qualify modifications to the at least one application's source code and configuration based on qualifying the executable branched development environment and the modifications to the at least one application's source code and configuration, wherein to qualify the modifications the at least one processor is further configured to automatically test the modifications to the at least one application's source code and configuration within the executable branched development environment responsive to submission or automatic detection of the modifications made in the executable branched development environment.

2. The system according to claim 1, further comprising an archive component configured to:
   store, automatically, cloned executable branched development environments; and
   store, automatically, any dependencies for the cloned executable branched development environments.

3. The system according to claim 2, wherein the archive component is further configured to transition respective cloned executable branched development environments between active and idle states.

4. The system according to claim 1, further comprising a security component configured to:
   de-provision environments and any dependencies; and
   generate non-repudiable guarantees for auditing the de-provisioning action.

5. The system according to claim 1, further comprising a monitoring component configured to detect automatically changes in the executable branched development environment code.

6. The system according to claim 5, wherein the monitoring component is configured to analyze executing environments periodically to detect changes in the executable branched development environment code and configuration.

7. The system according to claim 1, further comprising a qualification component configured to:
   instantiate historical development environments; and
   execute current test executions against a plurality of historical development environments responsive to identifying a failed test during the current test execution.

8. The system according to claim 1, further comprising an analysis component configured to determine configuration differences between an external environment and a cloned executable branched development environment.

9. The system according to claim 8, wherein the analysis component is configured to execute qualification scripts to determine differences in the external environment and the cloned executable branched development environment.

10. The system according to claim 9, wherein the analysis component is configured to determine differences in the external environment and the cloned executable branched development environment responsive to different results returned from the qualification scripts.

11. The system according to claim 8, wherein the analysis component is configured to synchronize configuration of the cloned executable branched development environment with the external environment.

12. The system according to claim 1, further comprising an interactive component configured to expose a cloned executable branched development environment to execution requests from external systems.

13. The system according to claim 12, wherein the interactive component is configured to expose the cloned executable branched development environment to testing requests.

14. The system of claim 1, wherein the at least one processor is further configured to maintain virtual machine instances of compiled versions of the codeline branches and respective executable branched development environments to manage the respective codeline branches and the respective executable branched development environments.

15. The system of claim 1, wherein the at least one processor is further configured to reject the modifications to the at least one application's source code and configuration responsive to failed qualification and accept the modifications to the at least one application's source code and configuration responsive to passed qualification.

16. A computer implemented method for managing development environments, the method comprising:
   defining, by a computer system, a plurality of source code revisions associated with at least one application;
   defining, by the computer system, a plurality of environment configurations, including data dependencies for the at least one application;
   generating, by the computer system, a respective executable branched development environment associated with a respective set of source code revisions and a respective set of environment configurations, wherein generating the respective executable branched development environment includes establishing the respective source code revisions and the respective set of environment configurations with a specified revision of the at least one application's source code and configuration;
   managing, by the computer system, respective codeline branches with respective executable branched development environments;
   cloning, by the computer system, the respective executable branched development environment on compute resources to mirror at least a portion of an existing production platform that supports the executable branched development environment, wherein the executable branched development environment is configured to accept modification to the at least one application's source code and configuration; and automatically qualifying, by the computer system, modifications to the at least one application's source code and configuration based on qualifying the executable branched development environment and the modifications to the at least one application's source code and configuration, wherein qualifying includes automatically testing the modifications to the at least one application's source code and configuration within the executable branched development environment responsive to submission or automatic detection of the modifications made in the executable branched development environment.

17. The method according to claim 16, wherein the method further comprises storing, automatically, cloned executable branched development environments.

18. The method according to claim 17, wherein storing, automatically, the cloned executable branched development environments includes storing, automatically, any dependencies for the cloned executable branched development environment.

19. The method according to claim 18, wherein the method further comprises transitioning respective cloned executable branched development environments between active and idle states.

20. The method according to claim 19, wherein the respective cloned executable branched development environment is associated with cloud compute resources executing the respective cloned executable branched development environment in the active state and wherein the respective cloned executable branched development environment is de-provisioned responsive to the transition to the idle state.

21. The method according to claim 16, wherein the method further comprises de-provisioning environments and any dependencies, and generating non-repudiable guarantees for auditing the de-provisioning action.

22. The method according to claim 16, wherein the method further comprises destroying environments and any dependencies, and generating non-repudiable guarantees for auditing the destruction action.

\* \* \* \* \*